United States Patent [19]

Cebon et al.

[11] Patent Number: 4,984,128
[45] Date of Patent: Jan. 8, 1991

[54] CAPACITATIVE WEIGHT SENSOR

[76] Inventors: David Cebon, Queen's College, Cambridge CB3 9ET; David J. Cole, 36 Lawn Road, Chelmsford, Essex CM1; Michael S. A. Hardy, Gonville & Caius College, Cambridge CB2 1TA; David E. Newland, Ickleton Lodge, Ickleton, Saffron Walden, Essex CB10 1SH, all of England

[21] Appl. No.: 330,427

[22] Filed: Mar. 30, 1989

[51] Int. Cl.$^5$ .................... H01G 7/00; G01G 3/14
[52] U.S. Cl. .................... 361/283; 177/210 C
[58] Field of Search ............ 177/210 C; 361/280, 361/283; 73/718, 724

[56] References Cited

U.S. PATENT DOCUMENTS

| | | | |
|---|---|---|---|
| 3,678,378 | 7/1972 | Trott et al. | 324/61 R |
| 3,782,486 | 1/1974 | Kuhn et al. | 177/210 C |
| 3,838,684 | 10/1974 | Manuel et al. | 361/283 |
| 3,952,234 | 4/1976 | Birchall | 361/283 |
| 4,198,670 | 4/1980 | Mann | 361/283 |

FOREIGN PATENT DOCUMENTS 0103360 3/1984 European Pat. Off. .
2615141 10/1976 Fed. Rep. of Germany .
3426165 4/1985 Fed. Rep. of Germany .

OTHER PUBLICATIONS

2244 Research Disclosure, No. 277, dated May 1987, New York, N.Y., p. 316.
The Capacitive Strip Sensor.

Primary Examiner—Donald A. Griffin
Attorney, Agent, or Firm—Remy J. VanOphem

[57] ABSTRACT

A load sensor which has an elongate hollow body 11, preferably formed as a metal extrusion, and which forms a first capacitative plate 21. A second parallel capacitative plate 15 is formed on an insulating body which is held in place relative to the extrusion by a resilient support 16. Application of a load to the extrusion causes variation in the gap between the plates of the capacitor, thus affecting the capacitance in a manner which is measured and processed to provide an output signal which is directly proportional to the applied load.

20 Claims, 1 Drawing Sheet

CAPACITATIVE WEIGHT SENSOR

BACKGROUND OF THE INVENTION

The invention relates to weight sensors and more particularly to a weight sensor which measures the variances in capacitance and provides an output signal directly proportional to the applied load.

SUMMARY OF THE INVENTION

In a parallel plate capacitor, a pair of mutually insulated electrodes, each mounted on a support, face each other across a gap. If a load is applied to one support so as to cause it to flex towards the other support, the plate separation will decrease, thus increasing the capacitance as a function of the force applied. If the capacitor is a strip capacitor, elongated in one dimension of the plate to at least, say, twice the other dimension, and if the load is applied only over a region of the length of the strip, the capacitance will vary as a function of the pressure and the area over which it is applied. Such capacitors are subject to non linearities, which lead to inaccuracy and to contamination if foreign matter can gain access to the gap between the electrodes.

According to one aspect of the invention, the problems of inaccuracy and contamination are alleviated by providing a capacitor with an elongated hollow body having a bore defined on one side by a wall which supports a first electrode, a second electrode disposed within the bore facing the first electrode and insulated therefrom, the wall being deformable in response to an applied load to move the electrode supported thereon relative to the second electrode.

Preferably the wall is of conductive material and constitutes the first electrode. The body is preferably in one piece, preferably an extrusion, preferably of metal, and preferably of aluminium. If the body is made of more than one piece, the pieces are preferably welded or glued together along an interface extending along the length of the strip, and the pieces are preferably of metal, preferably of stainless steel.

When the hollow body is of conducting material, the second electrode is preferably mounted on an insulator mounted within the hollow body. The second electrode may be conducting film deposited on an insulating substrate. The substrate may be provided with conductive film divided longitudinally into three parallel strips, of which the center strip forms the second electrode; the other two strips may engage shoulders on the hollow body projecting from either side of the first electrode by a distance equal to the desired inter-electrode gap. When the second electrode is a conductive film deposited on a substrate, means may be provided to press the substrate towards the first electrode, preferably using a resilient material which includes a spring strip and/or a pad of resilient resin or polymer material.

Preferably the capacitor is connected to an electronic circuit to convert the capacitance to an output reading of desired form, and this electronic circuit is preferably mounted within the same hollow body. This provides protection of the electronic circuit, and keeps the connecting cables between the electrodes on the electronic circuit as short as possible.

Preferably the electrodes are divided into mutually insulated portions spaced along the length of the strip. The capacitances of separate portions can be used to give weight readings from corresponding regions along the length of the strip. Connections can be made between the individual portions and an electronic circuit at one end of the strip of conductors contained within the hollow body, and when a substrate is provided to support the second electrode, the connections to the electronic circuits may constitute conductive material deposited on the side of the substrate remote from the second electrode.

It is known to use a capacitor having parallel plates which are relatively moved in response to the depression of a weighbridge and hence derive a weight value from the capacitance variation. A weighbridge weighs an object statically and requires a pit under the roadway for the weighbridge table supports. It is therefore, highly inconvenient for use in temporary locations.

The invention in another aspect provides a method of measuring the weight of an object moving at a constant velocity across a strip parallel plate capacitor, the method including supporting one electrode of the capacitor on a support which deflects linearly with applied force with respect to a second electrode and counting the cycles of a signal generated at a frequency which is inversely proportional to the capacitance, which itself is inversely proportional to the electrode separation. Thus the frequency is directly proportional to the applied pressure. A count of the signal cycles thus is proportional to the total force applied by the object as it passes over the strip.

According to the invention in a third aspect, there is provided a capacitor having first and second spaced electrodes, the second electrode being formed as a first portion of a conducting film, the film including second portions non-contiguous with the first portion and the second portions being arranged to abut supports connected to the first electrode.

BRIEF DESCRIPTION OF THE DRAWINGS

An example of the invention will now be described by way of example with reference to the accompanying drawings in which.

DETAILED DESCRIPTION OF THE PREFERRED EMBODIMENT

Figure 1:
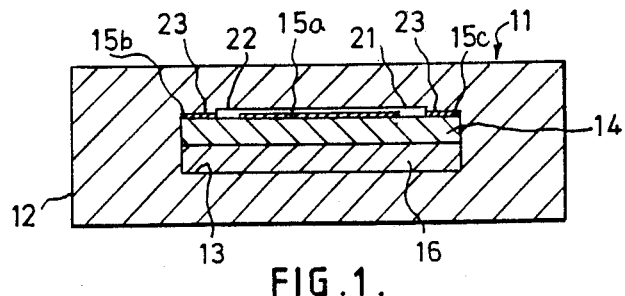
FIG. 1 is a cross-section through a strip capacitor according to one embodiment of the invention.

FIG. 1 illustrates a strip capacitor 11 having a hollow aluminium extrusion 12 containing within its hollow bore 13 a printed circuit board 14 bearing on its upper surface an etched copper film and a resilient pad strip 16 pressing the printed circuit board 14 upwards within the bore. An upper surface 21 of the hollow bore has a central recess 22 between side shoulders 23, the recessed surface forming the upper electrode of the capacitor. The copper film on the printed circuit board is etched to form three parallel strips running lengthwise along the capacitor strip. The central strip 15a of the copper film forms the lower electrode of the capacitor. The two side strips 15b and 15c, are pressed into engagement with respective shoulders 23 of the aluminium extrusion by the resilient pad strip 16. A stainless steel spring strip or resilient filler could be used in addition or in substitution and the filler could be a resilient resin or polymer either injected directly into the hollow bore below the printed circuit board substrate or injected into tubes running below the substrate. Assuming that the copper film deposited on the printed circuit board 14 is uniform across the width of the board, the air gap of the capacitor is accurately controlled to be equal to the depth of the recess and is independent of any variation in copper film thickness which may occur between different components. The aluminum extrusion 12 provides an electro-magnetic shield for the capacitor as well as a physically protective shield against impact damage.

When a body such as a vehicle wheel passes in contact with the upper surface of the extrusion, the portion of the aluminium extrusion above the recess is deformed to reduce the air gap and, therefore, increase the capacitance of the capacitor which is connected to a capacitance measuring circuit 31 at one end of the extrusion within its bore.

The capacitance C of the sensor is related to the air gap clearance width d such that $$C/Co = (1 - w/L) + w/L(do/d) \qquad (1)$$

Co = No-load capacitance
do = No-load air gap clearance
w = tire contact width
L = sensor length The air gap clearance varies linearly with the applied pressure P so that $$d = do - P/k$$

where k = spring stiffness of strip

The strip is connected into an oscillator circuit which is designed to generate a frequency which is inversely proportional to the capacitance C $$f = fo \cdot Co/C$$

where fo = the no-load oscillator frequency.

Assuming that the change in air gap clearance is small so that $d > 0.95 do$, equations 1-3 can be combined to give $$f = fo - (fo/do \cdot kL)Pw \qquad 45$$

Thus the frequency varies linearly with Pw, the product of contact pressure and contact width.

In order to determine the total wheel force, the frequency is integrated over the period of the tire contact by summing cycles of the oscillator with a counter. The difference between this sum and the sum with no load is directly proportional to the instantaneous wheel force. The oscillator forms part of an electronic circuit contained within the hollow body housing the strip capacitor so that the electronic circuit is protected from damage and electro-magnetic interference, and the connecting cables are as short as possible. Connecting cables from the end of the strip lead to a counter which counts the cycles generated by the oscillator.

Figures 2A, 2B, 2C:
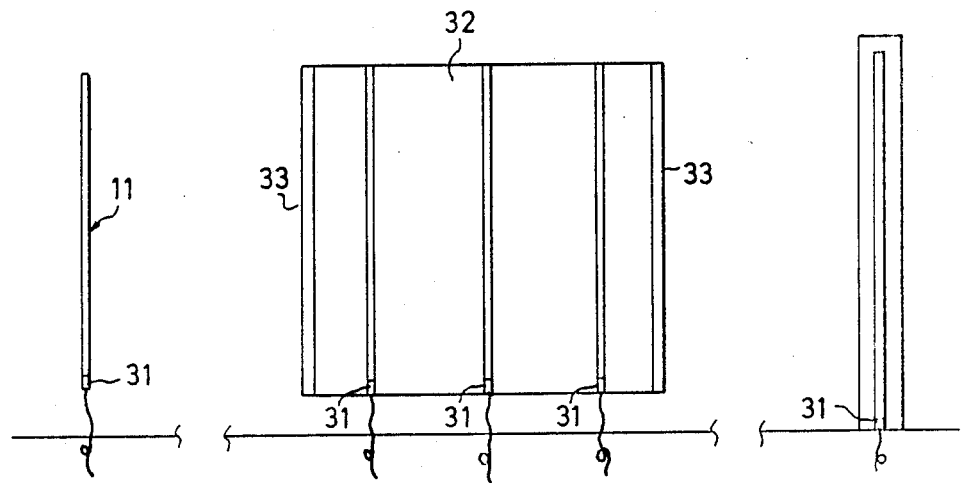
FIGS. 2A, 2B, and 2C are plan views of strip capacitors attached to a road surface.
Figures 3A, 3B, 3C:
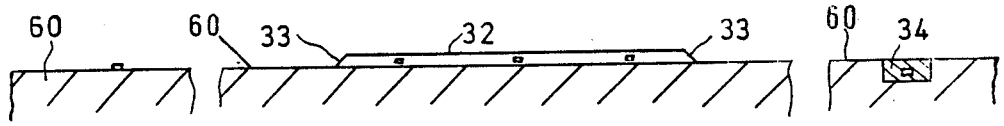
FIGS. 3A, 3B, and 3C are corresponding side elevations of the capacitors of FIG. 2.

The extrusion is approximately 9 mm high, 27 mm wide and 1.5 m long. In the arrangement shown in FIGS. 2A, 2B, 2C and 3A, 3B and 3C these strips extend transversely across a road. The extrusion is sufficiently flexible to conform to any curvature in the road surface. The connecting cables from the end of the strip lead to a data logging device including the frequency counter which is mounted at the side of the road. In FIGS. 2A and 3A, a single capacitor strip 11 is glued or othewise secured to a road surface 60. In FIGS. 2B and 3B, several, in this case three capacitor strips 11 are mounted within a polymer tile 32 which itself can conform to any curvature in the road surface. The leading and tailing edges 33 of the tile are chamfered. The three strips provide separate weight readings, and can be used to ascertain whether the vehicle forces are changing as the vehicle crosses the tile. In FIGS. 2C and 3C, the sensor strip is mounted within a recess 34 cut into the road surface, the remainder of the recess being filled with resin or a polymer. The resin transmits the weight of the wheel to the upper wall of the hollow body and supports the hollow body from below efficiently. Although the cutting of a recess 34 in the road surface involves extra effort, this method of mounting is preferred in some applications since the wheel is not deflected upwards by the strip sensor which might result in an inaccurate reading.

The components of the sensor are fed into the bore of the extrusion from one end. Alternatively, the bore could be defined by two pieces, a base and a cover, in which the case components could be placed in the base and the cover subsequently secured, for example by welding or glueing with a suitable adhesive. Stainless steel would then be suitable material for the body.

Figure 4:
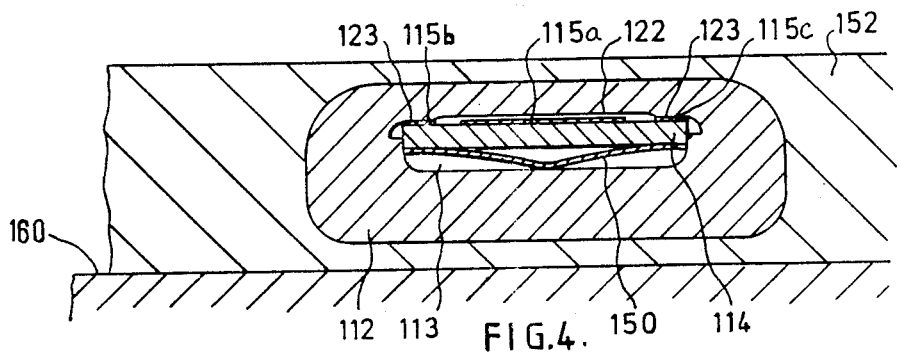
FIG. 4 is a cross-section through a strip capacitor according to a second embodiment of the invention.

A second embodiment of the invention is shown in FIG. 4, placed on a road surface 160, in which like parts, to those of the embodiment of FIG. 1, are indicated by like reference numerals with the addition of 100. In this embodiment, the printed circuit board 114 is pressed into engagement with side shoulders 123 by means of a resilient elongate strip, 150, shown in lateral cross-section, which is preferably formed from a spring material, preferably stainless steel. The aluminium extrusion 112 is surrounded by a polymer encapsulation 152.

We claim:

1. A method of measuring the weight of an object moving at a constant velocity across a strip parallel plate capacitor having a width of less than 30 mm, comprising the steps of:

supporting a first electrode of said parallel plate capacitor on a support which deflects linearly with an applied force with respect to a stationary second electrode, generating an electrical signal having a frequency which is inversely proportional to the capacitance of said parallel plate capacitor and directly proportional to the applied pressure and loaded width, and detecting the change in said frequency of said electrical signal to generate a signal indicative of said applied force.

2. A strip capacitor comprising elongated first and second spaced electrodes having a length substantially greater than their widths, said elongated second electrode being formed as a first portion of a conducting film disposed on an insulating member, said conducting film including a pair of parallel second portions non-contiguous with said first portion and wherein said parallel second portions are arranged to abut longitudinal supports projecting from opposite sides of said first electrode which define the spacing between said elongated first and second electrodes.

3. A strip capacitor comprising:

an elongated hollow body having a length substantially greater than its width, said elongated hollow body having a bore which longitudinally extends the length of said elongated hollow body, said bore being enclosed on one side by a wall which defines an upper surface of said bore, said wall and said upper surface being resiliently deformable in response to an applied load;

a longitudinally extending first electrode integral with said upper surface of said bore and resiliently deformable therewith; and a longitudinally extending second electrode disposed in said bore parallel to said first electrode and electrically insulated therefrom, said first electrode separated from said second electrode by an air gap, said resilient deformation of said wall and upper surface moving said first electrode relative to said second electrode to change said air gap.

4. The strip capacitor as claimed in claim 3 wherein said wall is formed of conductive material and constitutes said first electrode.

5. The strip capacitor as claimed in claim 3 wherein said elongated hollow body is formed in one piece.

6. The strip capacitor as claimed in claim 5 wherein said elongated hollow body is an extrusion.

7. The strip capacitor as claimed in claim 3 wherein said elongated hollow body is formed of a plurality of pieces, said plurality of pieces being welded or glued together along an interface extending along said length of said elongated hollow body.

8. The strip capacitor as claimed in claim 3 wherein said second electrode is disposed on an insulating member disposed within said elongated hollow body.

9. The strip capacitor as claimed in claim 8 wherein said bore has a pair of longitudinal shoulders projecting from either side of said first electrode by a distance equal to a desired inter electrode gap, said insulating member engaging said pair of longitudinal shoulders.

10. The strip capacitor as claimed in claim 9 wherein said second electrode comprises a conductive film deposited on said insulating member.

11. The strip capacitor as claimed in claim 10 wherein said conductive film is divided longitudinally into a central strip and two parallel side strips, said central strip being said second electrode.

12. The strip capacitor as claimed in claim 11 wherein each of said two parallel side strips engages a respective one of said pair of longitudinal shoulders.

13. The strip capacitor as claimed in claim 9 further comprising resilient means for pressing said insulating member towards said first electrode to engage said pair of longitudinal shoulders.

14. The strip capacitor as claimed in claim 13 wherein said resilient means is a resilient material.

15. The strip capacitor as claimed in claim 14 wherein said resilient material comprises one material selected from the following group: a spring strip, a pad of resilient resin material, a pad of resilient polymer material.

16. The strip capacitor as claimed in claim 3 wherein said first and second electrodes are divided into mutually insulated portions spaced along the length of said elongated hollow body.

17. The strip capacitor as claimed in claim 3 further comprising a processing circuit for converting the capacitance to an output reading.

18. The strip capacitor as claimed in claim 17 wherein said processing circuit is mounted within said elongated hollow body.

19. A strip capacitor comprising:

an elongated hollow body having a length substantially greater than its width, said elongated hollow body having a bore which longitudinally extends the length of said elongated hollow body, said bore being enclosed on one side by a wall which defines an upper surface of said bore, said wall and said upper surface constituting a first electrode which is resiliently deformable in response to an applied load;

a longitudinally extending electrode fixedly disposed in said bore parallel to said first electrode and electrically insulated therefrom, said first and second electrodes having mutually opposed parallel planar surfaces having an air gap therebetween, said air gap being the dielectric between said mutually opposed parallel planar surfaces, said resilient deformation of said wall and upper surface moving said first electrode relative to said second electrode to decrease said air gap in proportion to said applied load, said air gap having a predetermined value when said applied load is zero.

20. A method of measuring the weight of an object moving at a constant velocity across a strip parallel plate capacitor comprising the steps of:

supporting a first electrode of said parallel plate capacitor on a support which deflects linearly with an applied force with respect to a stationary second electrode;

generating an electrical signal having a frequency which is inversely proportional to said deflection of said support in response to an applied force and directly proportional to said applied force; and counting the cycles of said electrical signal when said force is applied to generate a signal indicative of the weight of said object moving at a constant velocity across said strip parallel plate capacitor.

* * * * *

UNITED STATES PATENT AND TRADEMARK OFFICE
CERTIFICATE OF CORRECTION

PATENT NO. : 4,984,128
DATED : January 8, 1991
INVENTOR(S) : Cebon et al

It is certified that error appears in the above-identified patent and that said Letters Patent is hereby corrected as shown below:

Column 2, line 13, after "is" insert ---- , ----.

Column 3, line 22, delete in its entirety and insert

---- C/Co=(1-w/L)+w/L(do/d)  (1) ----.

Column 4, line 2, delete "othewise" and insert

---- otherwise ----.

Column 4, line 23, delete "the" first occurrence, and insert ---- the -- after "case".

Column 4, line 33, delete "strip," and insert ---- strip ----.

Signed and Sealed this

Thirtieth Day of June, 1992

Attest:

DOUGLAS B. COMER

*Attesting Officer*     *Acting Commissioner of Patents and Trademarks*